United States Patent
Lin et al.

(10) Patent No.: US 8,259,621 B2
(45) Date of Patent: Sep. 4, 2012

(54) METHOD AND SYSTEM FOR SUPPORTING NETWORK SHARING AND DATA SYNCHRONIZATION SIMULTANEOUSLY

(75) Inventors: Yuan-Tai Lin, Taoyuan County (TW); Ching-Keng Fang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 76 days.

(21) Appl. No.: 12/204,772

(22) Filed: Sep. 4, 2008

(65) Prior Publication Data

US 2009/0059965 A1 Mar. 5, 2009

Related U.S. Application Data

(60) Provisional application No. 60/970,244, filed on Sep. 5, 2007.

(51) Int. Cl.
*H04Q 11/00* (2006.01)
(52) U.S. Cl. ........ 370/259; 370/509; 455/557; 709/229; 711/154; 713/1
(58) Field of Classification Search .................. None
See application file for complete search history.

(56) References Cited

U.S. PATENT DOCUMENTS

| | | | |
|---|---|---|---|
| 6,289,391 B1 | 9/2001 | Smith et al. ................... 719/312 |
| 6,496,847 B1 | 12/2002 | Bugnion et al. | |
| 6,976,180 B2 | 12/2005 | Cupps et al. ................... 713/300 |
| 7,127,723 B2 | 10/2006 | Endo et al. | |
| 7,158,972 B2 | 1/2007 | Marsland ...................... 709/216 |
| 7,184,003 B2 | 2/2007 | Cupps et al. .................... 345/30 |
| 2001/0029550 A1 | 10/2001 | Endo et al. | |
| 2002/0059080 A1* | 5/2002 | Kasirer et al. ..................... 705/2 |
| 2003/0220141 A1 | 11/2003 | Corrigan et al. | |
| 2003/0226044 A1 | 12/2003 | Cupps et al. | |
| 2005/0071768 A1* | 3/2005 | Araki et al. ................... 715/757 |
| 2005/0091436 A1 | 4/2005 | Huang | |
| 2005/0182922 A1* | 8/2005 | Guo et al. ........................ 713/1 |
| 2005/0266881 A1* | 12/2005 | Keppler et al. ............... 455/557 |
| 2006/0010314 A1 | 1/2006 | Xu .................................... 713/2 |
| 2006/0123432 A1* | 6/2006 | Bendapudi et al. ........... 719/330 |
| 2006/0161985 A1* | 7/2006 | Zhao ............................... 726/24 |

(Continued)

FOREIGN PATENT DOCUMENTS

CN 101022521 8/2007

(Continued)

OTHER PUBLICATIONS

"Search Report of European counterpart application", issued on Mar. 23, 2009, p. 1-p. 6.

(Continued)

*Primary Examiner* — Chi H. Pham
*Assistant Examiner* — Shick Hom
(74) *Attorney, Agent, or Firm* — Jianq Chyun IP Office (57) ABSTRACT

A method and a system for simultaneously supporting network sharing and data synchronization are provided for a first operating system (OS) and a second OS, wherein the first OS is connected to a network. The present method establishes a virtual network between the first OS and the second OS. Then, the second OS is connected to the first OS through the virtual network, so as to connect to the network through the first OS. The virtual network can also be used for synchronizing data of the first and second OS. As a result, the convenience of using different OS at the same time can be improved.

18 Claims, 4 Drawing Sheets

U.S. PATENT DOCUMENTS

| | | |
|---|---|---|
| 2006/0235898 A1* | 10/2006 | Loveland ................... 707/200 |
| 2006/0236376 A1* | 10/2006 | Liu et al. ...................... 726/4 |
| 2007/0005946 A1* | 1/2007 | Zimmer et al. ................ 713/1 |
| 2007/0022258 A1* | 1/2007 | Panabaker et al. ......... 711/149 |
| 2007/0038875 A1 | 2/2007 | Cupps et al. ............... 713/300 |
| 2007/0043961 A1 | 2/2007 | Cupps et al. ............... 713/300 |
| 2007/0140199 A1 | 6/2007 | Zhao et al. |
| 2008/0222076 A1* | 9/2008 | Dandekar et al. ............. 707/1 |
| 2009/0061838 A1 | 3/2009 | Lin ............................. 455/418 |
| 2009/0064186 A1 | 3/2009 | Lin ............................. 719/315 |

FOREIGN PATENT DOCUMENTS

| | | |
|---|---|---|
| EP | 1526455 | 4/2005 |
| EP | 1796011 | 6/2007 |
| TW | 200523752 | 7/2005 |
| WO | 2005055117 | 6/2005 |
| WO | 2006088809 | 8/2006 |

OTHER PUBLICATIONS

"Search Report of European counterpart application of co-pending Application", issued on Jan. 29, 2009, p. 1-p. 8.

Jay Munro, "Virtual Machines & VNware, Part II", Dec. 28, 2001.

"Second Office Action of China Counterpart Application", issued on Mar. 8, 2011, p. 1-p. 17.

"Office Action of Taiwan Counterpart Application", issued on Jun. 21, 2011, p. 1-p. 3.

"Non-Final Office Action of America Co-pending U.S. Appl. No. 12/204,780", issued on Jan. 24, 2012, p. 1-p. 29.

"Non-Final Office Action of America Co-pending U.S. Appl. No. 12/204,776", issued on Jan. 11, 2012, p. 1-p. 9.

"Notice of Allowance of U.S. counterpart" U.S. Appl. No. 12/204,776 issued on Apr. 20, 2012, p. 1-p. 6.

"1st Office Action of China Counterpart Application of the co-pending application", issued on Jul. 24, 2009, p. 1-p. 5.

* cited by examiner

METHOD AND SYSTEM FOR SUPPORTING NETWORK SHARING AND DATA SYNCHRONIZATION SIMULTANEOUSLY

CROSS-REFERENCE TO RELATED APPLICATION

This application claims the priority benefit of U.S. provisional application Ser. No. 60/970,244, filed on Sep. 5, 2007 by the same applicant. There is a co-pending U.S. patent application filed on the same date by the same applicant, entitled "MOBILE DEVICE WITH MULTIPLE OPERATING SYSTEMS AND METHOD FOR SHARING A WIRELESS COMMUNICATION MODULE BETWEEN OPERATING SYSTEMS THEREOF", which also claims the priority benefit of the aforementioned U.S. provisional application. All disclosure of the U.S. provisional application and the co-pending U.S. patent application are incorporated herein by reference.

BACKGROUND OF THE INVENTION

1. Field of the Invention

The present invention relates to a method and a system for data synchronization. More particularly, the present invention relates to a method and a system for concurrently supporting network sharing and data synchronization.

2. Description of Related Art

The most popular general purpose mobile devices include two major categories, namely notebook personal computers (PC) and personal digital assistants (PDA). Notebook PCs adopt x86 architecture and non-embedded OS (e.g. Microsoft Windows OS), which have higher computing power and consume more electric energy. PDAs adopt embedded architecture and embedded OS (e.g. Microsoft Windows Mobile OS), which have lower computing power and consume less electric energy.

Figure 1:
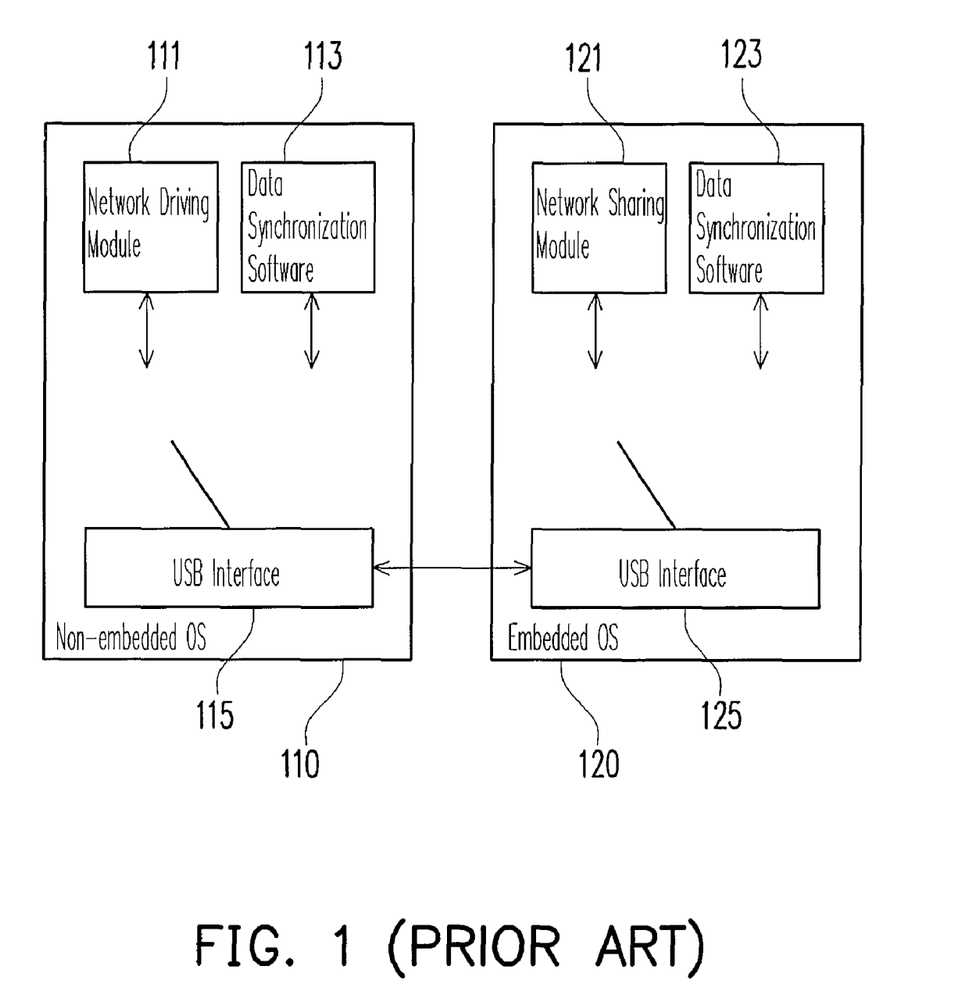
FIG. 1 is a block diagram of two conventional operating systems sharing the ability of network access and synchronizing data.

The embedded OS has both network access capability and electronic commercial capability. Referring to FIG. 1, when the non-embedded OS 110 connects to the embedded OS 120 through universal serial bus (USB) interfaces 115 and 125, the embedded OS 120 shares the network access ability to the non-embedded OS 110 by using the network sharing module 121 and USB interfaces 125 and 115. Besides, while the data synchronization software such as Microsoft ActiveSync is installed in the embedded OS 120 and the non-embedded OS 110, the purpose of synchronizing electronic commercial data (e.g. telephone numbers and e-mail addresses of contact persons, to-do lists, e-mails, schedules, and any other data involved with activities in modern offices) of the two operating systems 110 and 120 can be achieved by the connection of USB interfaces 115 and 125.

However, the non-embedded OS 110 can connect to the network only if the network driving module 111 and the network sharing module 121 are connected to each other through USB interfaces 115 and 125. On the other hand, the data synchronization between the two operating systems 110 and 120 can be achieved only if the data synchronization software 113 and 123 are connected to each other through the USB interfaces 115 and 125. As shown in FIG. 1, the network driving module 111 and the data synchronization software 113 of the non-embedded OS 110 can not connect to the USB interface 115 at the same time, and the network sharing module 121 and the data synchronization software 123 can not connect to the USB interface 125 at the same time either. As a result, the embedded OS 120 can not provide the abilities of network sharing and data synchronization to the non-embedded OS 110 at the same time. This problem brings about a lot of inconvenience. For example, if the user just receives an e-mail in one of the two operating systems and wants to synchronizes the e-mail with the other OS, he has to disable the network access first. And if the user wants to continue the network access, he has to postpone the data synchronization.

SUMMARY OF THE INVENTION

Accordingly, the present invention is directed to a method for supporting network sharing and data synchronization simultaneously, the method makes two different operating systems share the network access ability and achieve the purpose of data synchronization at the same time.

The present invention is directed to a system for supporting network sharing and data synchronization simultaneously. By establishing a virtual network, different operating systems can share the network access ability and synchronize data simultaneously.

The present invention is directed to a method for supporting network sharing and data synchronization simultaneously, suitable for a first operating system (OS) and a second OS, wherein the first OS connects to a network. In the present method, a virtual network between the first OS and the second OS is established first. Then, a connection of the first OS and the second OS is generated through the virtual network, wherein a plurality of data stored in the first OS and the second OS are synchronized through the virtual network. Moreover, the virtual network is used for connecting the second OS to the first OS so as to connect the second OS to the network through the first OS.

According to an embodiment of the present invention, wherein after the step of establishing the virtual network, a command link and a notify link between the first OS and the second OS are established through the virtual network. Then, an identification and a content relative to a data to be synchronized are obtained, wherein the data to be synchronized is an item of one of the first OS and the second OS. And the relative data in the other one of the first OS and the second OS is updated according to the identification and the content.

According to an embodiment of the present invention, a data-modifying operation corresponding to the data to be synchronized is detected, wherein the data to be synchronized is the item of the second OS. Then, the data to be synchronized is encoded into a command packet, and the command packet is transmitted to the first OS through the command link. The first OS parses the command packet so as to perform the data-modifying operation according to the command packet.

According to an embodiment of the present invention, a data-modifying operation corresponding to the data to be synchronized is detected, wherein the data to be synchronized is the item of the first OS. Then, the data to be synchronized is encoded into a notify packet, and the notify packet is transmitted to the second OS through the notify link. The second OS parses the notify packet so as to perform the data-modifying operation according to the notify packet.

According to an embodiment of the present invention, wherein the command link and the notify link follow a transmission control protocol/internet protocol (TCP/IP) standard, and are established on an universal serial bus (USB) interface.

According to an embodiment of the present invention, wherein the data to be synchronized at least comprises one of a telephone number, an e-mail address, a schedule, an e-mail, and a to-do list.

According to an embodiment of the present invention, a network data is received from the network by one of the first OS and the second OS. And the network data is transmitted to other one of the first OS and the second OS through the virtual network to be stored or displayed. Wherein, the network data comprises a push mail or a push message. The network data is transmitted through an universal asynchronous receiver/transmitter (UART) interface or an USB interface through the virtual network if the network data is the push message.

According to an embodiment of the present invention, the first OS comprises an embedded OS, and the second OS comprises a non-embedded OS.

On the other point of view, the present invention is directed to a system for supporting network sharing and data synchronization simultaneously. The system comprises a first OS and a second OS. The first OS comprises a network connecting module, a network sharing module and a first data synchronization module. The network connecting module connects the first OS to a network. The network sharing module is coupled to the network connecting module, suitable for establishing a virtual network. And the first data synchronization module is connected to the network sharing module. The second OS comprises a network driving module and a second data synchronization module which are connected to each other. The network driving module connects to the first OS through the virtual network, and connects to the network through the first OS. The first data synchronization module and the second data synchronization module synchronize a plurality of data stored in the first OS and the second OS through the virtual network.

According to an embodiment of the present invention, the first data synchronization module and the second data synchronization module establish a command link and a notify link between the first OS and the second OS through the virtual network, obtain an identification and a content relative to a data to be synchronized, wherein the data to be synchronized is an item of one of the first OS and the second OS, and update the relative data of the other one of the first OS and the second OS according to the identification and the content.

According to an embodiment of the present invention, the second data synchronization module detects a data-modifying operation corresponding to the data to be synchronized, wherein the data to be synchronized is the item of the second OS. Moreover, the second data synchronization module encodes the data to be synchronized into a command packet and transmits the command packet to the first OS through the command link. The command packet is parsed by the first OS so as the data-modifying operation can be performed according to the command packet by the first OS.

According to an embodiment of the present invention, the first data synchronization module detects a data-modifying operation corresponding to one of the data to be synchronized, wherein the data to be synchronized is the item of the first OS. Then, the first data synchronization module encodes the data to be synchronized into a notify packet and transmits the notify packet to the second OS through the notify link. The notify packet is parsed by the second OS so as the data-modifying operation can be performed according to the notify packet by the second OS.

According to an embodiment of the present invention, wherein the data to be synchronized at least comprises one of a telephone number, an e-mail address, a schedule, an e-mail, and a to-do list.

According to an embodiment of the present invention, wherein the command link and the notify link are established on an USB interface, and follow a TCP/IP standard.

According to an embodiment of the present invention, the network connecting module receives a network data through the network. After that, the first data synchronization module makes the second data synchronization module to store or display the network data on the second OS through the virtual network. The network data comprises a push mail or a push message. The virtual network transmits the network data through an UART interface or an USB interface if the network data is the push message.

According to an embodiment of the present invention, the first OS comprises an embedded OS, and the second OS comprises a non-embedded OS.

In the present invention, by establishing the virtual network between the two operating systems, the ability of network access can be shared among the two operating systems. Moreover, the data synchronization between the two operating systems can also be achieved through the virtual network.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 2:
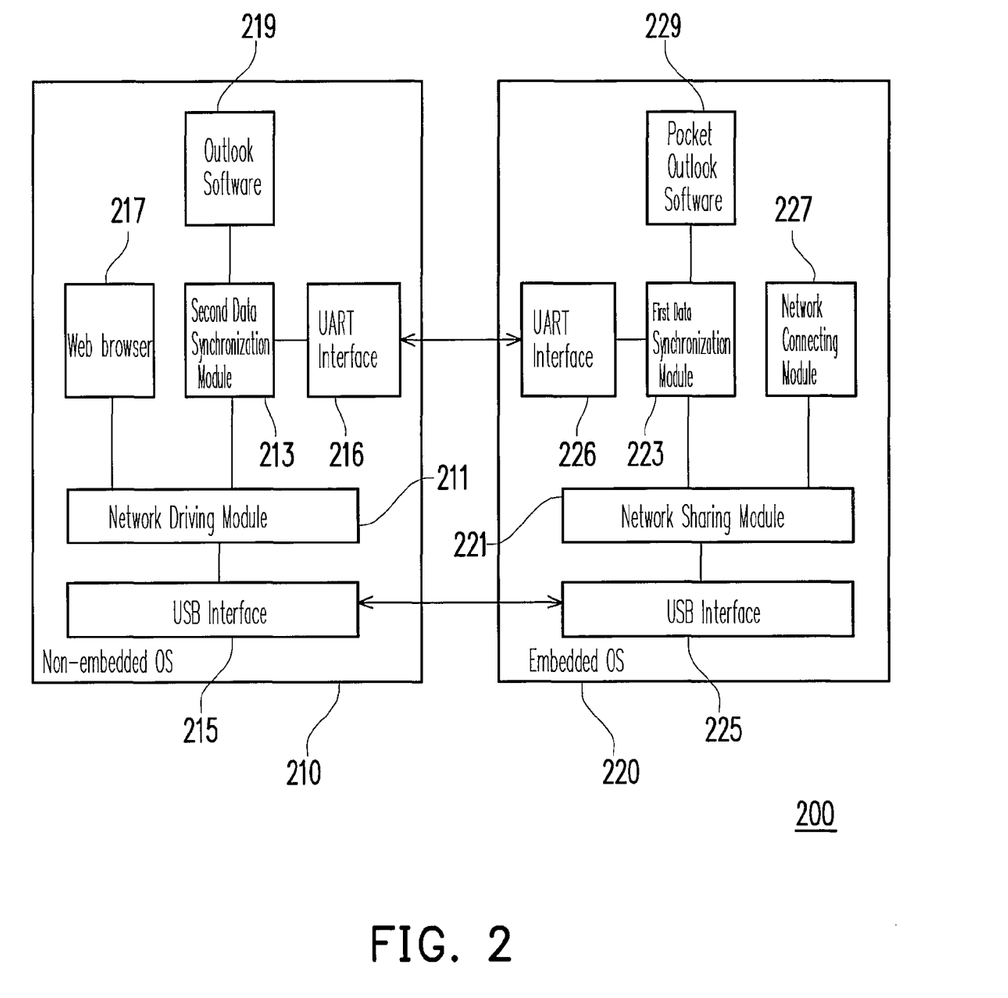
FIG. 2 is a block diagram of a system for simultaneously supporting network sharing and data synchronization according to an embodiment of the present invention.

FIG. 2 is a block diagram of a system for simultaneously supporting network sharing and data synchronization according to an embodiment of the present invention. Referring to FIG. 2, a system 200 for simultaneously supporting network sharing and data synchronization comprises two different operating systems called a first OS and a second OS. For the convenience of illustration, it is assumed that the first OS and the second OS are an embedded OS 220 and a non-embedded OS 210 respectively. In the system 200, a first data synchronization module 223 and a second data synchronization module 213 are used for solving the problem of the embedded OS 220 can not simultaneously share the network access ability and synchronize data in the conventional architecture.

While integrating the system 200 into a mobile electronic device, a user can not only enjoy the convenience of using two different operating systems, but also needs no more time to switch the function between network access and data synchronization. Consequently, it is more conveniently for the user to use the mobile electronic device, and the efficiency of utilization can be increased.

In this embodiment, the embedded OS 220 comprises a network connecting module 227 for connecting the embedded OS 220 to a network, a network sharing module 221 for establishing a virtual network, a first data synchronization module 223 for data synchronization, and an universal serial bus (USB) interface 225 and an universal asynchronous receiver/transmitter (UART) interface 226. Comparing FIG. 1 with FIG. 2, the most significant difference between the first data synchronization module 223 and the data synchronization software 123 is that the first data synchronization module 223 connects to the network sharing module 221, not directly connects to the USB interface 225. Moreover, the network connecting module 227 and the first data synchronization module 223 can connect to the network sharing module 221 at the same time, and the network sharing module 221 is connected to the USB interface 225 permanently.

The non-embedded OS 210 comprises a network driving module 211, a second data synchronization module 213 for data synchronization, and an USB interface 215 and an UART interface 216. The network driving module 211 connects to the embedded OS 220 through the virtual network, so as to connect to the network through the embedded OS 220. Please comparing the non-embedded OS 210 with the non-embedded OS 110 of FIG. 1, the second data synchronization module 213 connects to the network driving module 211, but the data synchronization software 113 is directly connects to the USB interface 115. Furthermore, a web browser 217 and the second data synchronization module 213 can connect to the network driving module 211 simultaneously, and the network driving module 211 is permanently connected to the USB interface 215. The architecture described above and the connection way between modules are the most important points to concurrently support the function of network sharing and data synchronization.

In this embodiment, the network sharing module 221 comprises a dynamic host configuration protocol (DHCP) module, a network address translation (NAT) module, and a domain name system (DNS) module. The virtual network between the non-embedded OS 210 and the embedded OS 220 can be established by using these three modules. The ability of network access of the embedded OS 220 can be shared with the non-embedded OS 210 through the virtual network. And the first data synchronization module 223 and the second data synchronization module 213 can establish network links through the virtual network to synchronize all data stored in the non-embedded OS 210 and embedded OS 220. A data to be synchronized of the two operating systems is, for example, the electronic commercial data include a telephone number, an e-mail address, a to-do lists, an e-mails, a schedule, or any other data involved with activities in modern offices. An Outlook software 219 and a Pocket Outlook software 229 provided by Microsoft are the most popular software to receive and manage the electronic commercial data. In the architecture as shown in FIG. 2, the embedded OS 220 can share the network access ability with the non-embedded OS 210, and data received by one of the two operating systems will be updated to the other operating system simultaneously.

The details of establishing network links between the first data synchronization module 223 and the second data synchronization module 213 through the virtual network so as to synchronize data will be illustrated in the following embodiment.

Figure 3:
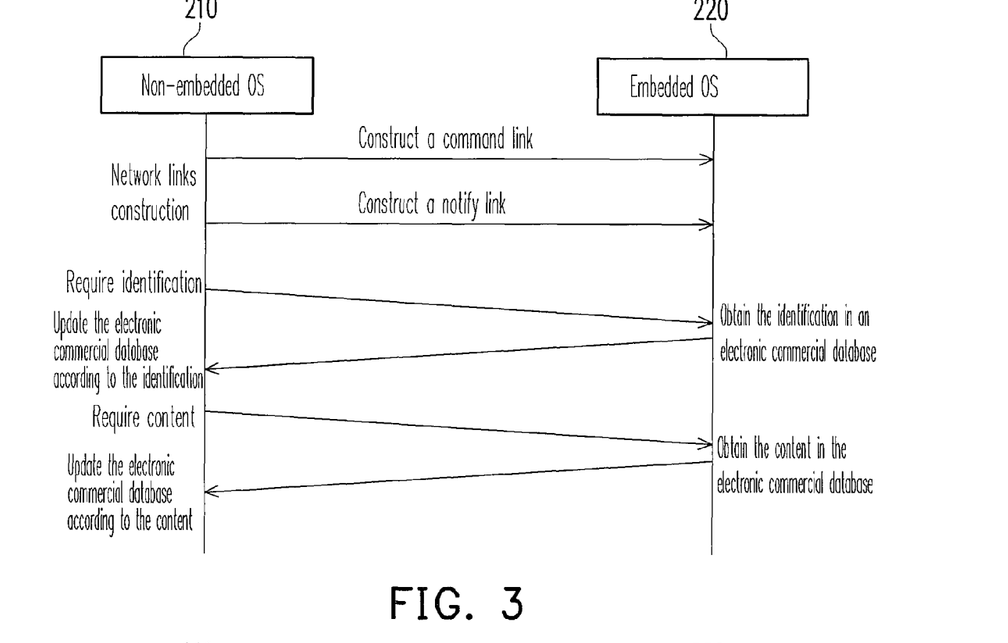
FIG. 3 is a flow chart of establishing a network connection according to an embodiment of the present invention.

FIG. 3 is a flow chart of establishing a network connection according to an embodiment of the present invention. Referring to FIG. 2 and FIG. 3, the establishment of network links such as a command link and a notify link between the non-embedded OS 210 and the embedded OS 220 are requested by the second data synchronization module 213 at first. Wherein the command link and the notify link follow a transmission control protocol/internet protocol (TCP/IP) standard, and transmit data through using USB interfaces 215 and 225. In this embodiment, the command link and the notify link have respective TCP ports. After establishing network links, the second data synchronization module 213 requires the embedded OS 220 that an identification and content relative to a data to be synchronized (e.g. an item of the embedded OS 220). After receiving the requirement sending by the second data synchronization module 213, the first data synchronization module 223 obtains the corresponding identification and content from an electronic commercial database (not shown) of the embedded OS 220, and transmit the identification and content to the non-embedded OS 210. The second data synchronization module 213 compares the received identification and content with data stored in an electronic commercial database (not shown) of the non-embedded OS 210, and updates the electronic commercial database accordingly.

As the procedures shown in FIG. 3, the second data synchronization module 213 finishes the creation, modification, and deletion of the item updated in the electronic commercial database of the embedded OS 220 since the last internal connection between the non-embedded OS 210 and embedded OS 220. It is worth to mention about that, although the establishment of network links are requested by the second data synchronization module 213 of the non-embedded OS 210 in this embodiment, the first data synchronization module 223 can also request a procedure identical with procedures of FIG. 3. That is, the establishment of network links is not limited to only can be requested by the non-embedded OS 210 in this invention.

Figure 4:
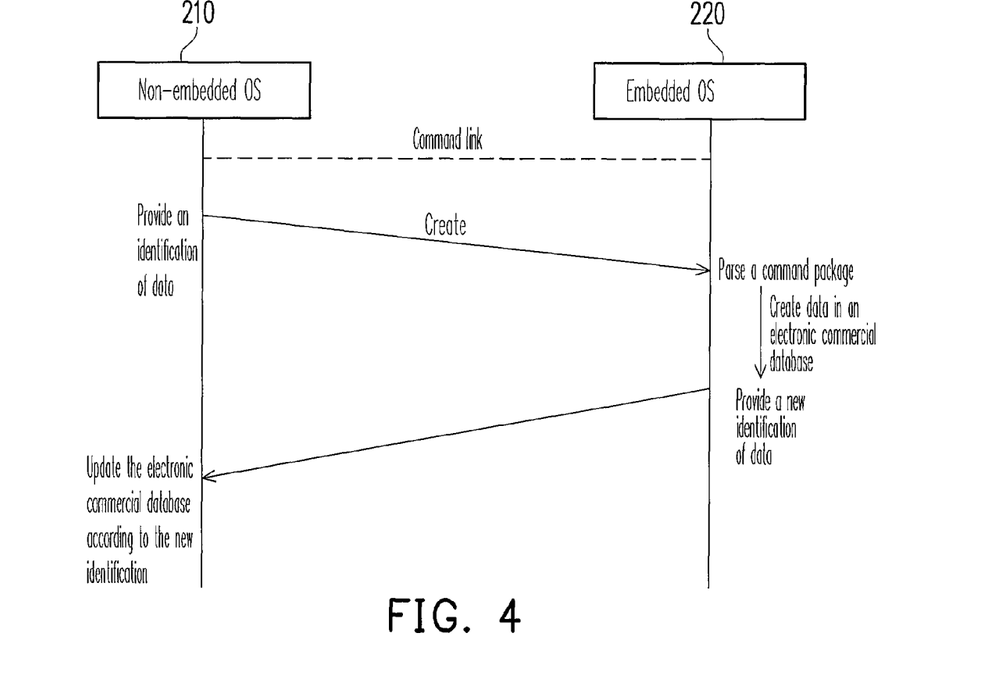
FIG. 4 is a flow chart of data synchronization according to an embodiment of the present invention.
Figure 5:
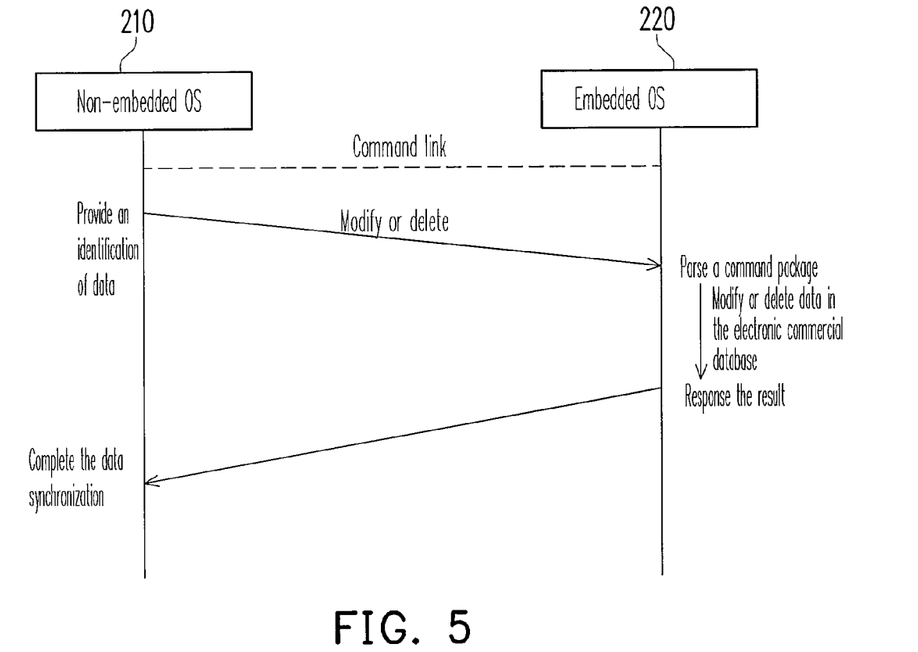
FIG. 5 is a flow chart of data synchronization according to another embodiment of the present invention.

FIG. 4 and FIG. 5 are flow charts of data synchronization according to an embodiment of the present invention. In this embodiment, a data-modifying operation (e.g. creation, modification and deletion) corresponding to an electronic commercial data to be synchronized is detected by the second data synchronization module 213. For the convenience of illustration, the electronic commercial data to be synchronized is noted as the data to be synchronized for short. The data to be synchronized is encoded and packed into a command packet, and transmitted to the embedded OS 220 through the command link. After receiving the command packet, the first data synchronization module 223 of the embedded OS 220 parses the command packet, and creates, modifies, or deletes items in the relative electronic commercial database according to the command packet. Finally, the processing result will be sent back to the non-embedded OS 210.

Figure 6:
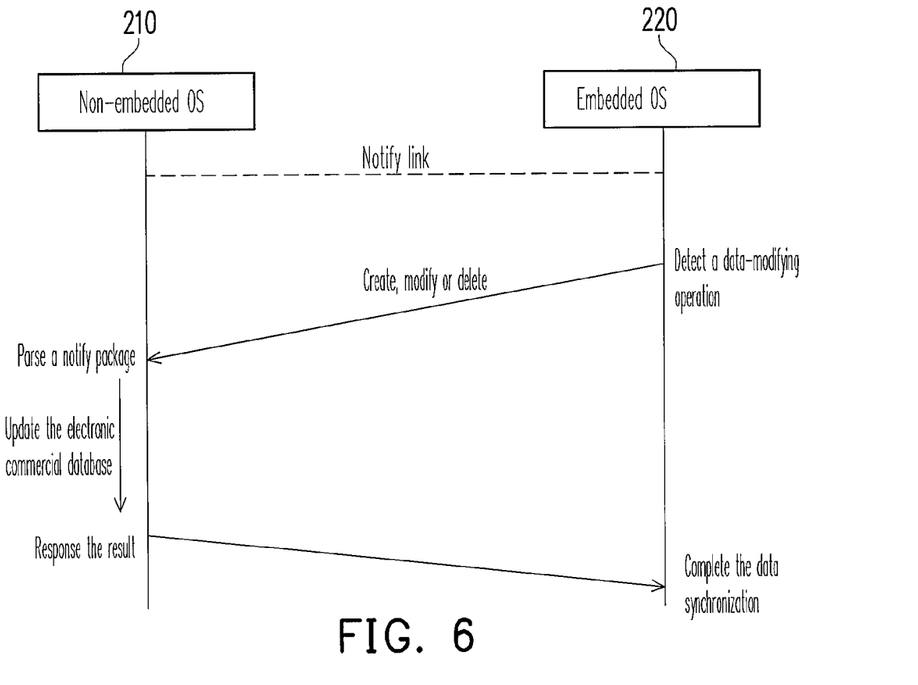
FIG. 6 is a flow chart of data synchronization according to another embodiment of the present invention.

FIG. 6 is a flow chart of data synchronization according to another embodiment of the present invention. In this embodiment, the first data synchronization module 223 detects a data-modifying operation executed in the embedded OS 220, wherein the data-modifying operation is relative to a data to be synchronized of the embedded OS 220. The first data synchronization module 223 encodes the data to be synchronized which is modified by the user into a notify packet, and sends the notify packet to the non-embedded OS 210 through the notify link. After the second data synchronization module 213 receives the notify packet, the notify packet is parsed by the second data synchronization module 213 so as to obtain the contents of the notify packet. According to the contents of the notify packets, the second data synchronization module 213 may create a new item in the electronic commercial database of the non-embedded OS 210, modify an item in the electronic commercial database of the non-embedded OS 210, or remove an item from the electronic commercial database of the non-embedded OS 210. Finally, the second data synchronization module 213 sends the processing result back to the embedded OS 220.

It is worth to mention about that, some services only directed against to specific operating system can be provided to the other kind of operating system by the method of data synchronization. For instance, a push mail service is a function directed against to an embedded OS, and the following embodiment will illustrate the way of using the push mail service by a non-embedded OS by the method of data synchronization.

Referring to FIG. 2, after the embedded OS 220 and the non-embedded OS 210 connect to the network through the network connecting module 227 and the network sharing module 221, a user can use the web browser 217 of the non-embedded OS 210 to access data in a web server, and the embedded OS 220 may receive other network data at the same time. For example, the embedded OS 220 may receive a push mail or a push message sent by a push server. That is, the network connecting module 227 connects to the push server and the web server at the same time so as to achieve the purpose of receiving the push mail and surfing the network simultaneously. The first data synchronization module 223 stored the push mail received by he network connecting module 227 and through the network sharing module 221 into the Pocket Outlook software 229. As the procedures shown in FIG. 3 to 6, by using USB interfaces 215 and 225, the push mail stored in the Pocket Outlook software 229 can be simultaneously stored into the Outlook software 219 of the non-embedded OS 210.

However, according to the setting by the user, the push server may only push a push message into the Pocket Outlook software 229 for noticing the user that a push mail of the user is received in the push server. As the procedures shown in FIG. 3 to 6, the push message received by the Pocket Outlook software 229 will be sent to the second data synchronization module 213 of the non-embedded OS 210 simultaneously through USB interfaces 215 and 225 or though UART interfaces 226 and 216. In this embodiment, the first data synchronization module 223 is capable of recognizing the push message and the push mail. The transmission of the push message which is smaller than the push mail can adopt UART interfaces 226 and 216 or USB interfaces 215 and 225. However, since the USB interface can provide a high-speed transmission, USB interfaces 215 and 225 are used for the transmission of the push mail which is in large quantity for ensuring the transmission rate. After the second data synchronization module 213 receives the push message, the push message can be displayed so as to notify the user that the push mail is waiting for receiving. In this embodiment, the second data synchronization module 213 is also capable of recognizing push message and push mail. Consequently, the push message will be directly display to the user, and the push mail will be stored into the Outlook software 219. As a result, the push service is not limit to the embedded OS 220, the user can also enjoy the benefit of the push service in the non-embedded OS 210.

In view of the above, the present invention provides a method and a system for simultaneously supporting network sharing and data synchronization. According to the above embodiments, the present invention establishes a virtual network between different operating systems, so as to simultaneously provide the function of network sharing and data synchronization through the virtual network. As a result, the user needs no more to switch the function between the network sharing and data synchronization when using the electronic device integrated different operating systems, the operation time can be saved and the efficiency can be increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for simultaneously supporting network sharing and data synchronization, suitable for a first operating system (OS) and a second OS, wherein the first OS connects to a network, and the second OS only connects to the network through the first OS, the method comprising:
  establishing a virtual network between the first OS and the second OS via a physical cable, wherein the first OS is an embedded OS and the second OS is a non-embedded OS, and the data in the first OS and in the second OS are externally coupled and stored in two different physical devices; and
  connecting the first OS and the second OS by the virtual network to directly synchronize a plurality of data stored in the first OS and the second OS through the virtual network and to connect the second OS to the network through the first OS and the virtual network; and
  performing data synchronization between the first OS and the second OS and simultaneously having the second OS accessing the network through the first OS.

2. The method as claimed in claim 1, wherein after the step of establishing the virtual network further comprising:
  establishing a command link and a notify link between the first OS and the second OS through the virtual network;
  obtaining an identification and a content relative to a data to be synchronized, wherein the data to be synchronized is an item of one of the first OS and the second OS; and
  updating the relative data in the other one of the first OS and the second OS according to the identification and the content.

3. The method as claimed in claim 2, further comprising:
  detecting a data-modifying operation corresponding to the data to be synchronized, wherein the data to be synchronized is the item of the second OS;
  encoding the data to be synchronized into a command packet;
  transmitting the command packet to the first OS through the command link; and
  parsing the command packet by the first OS, and performing the data-modifying operation according to the command packet by the first OS.

4. The method as claimed in claim 2, further comprising:
  detecting a data-modifying operation corresponding to the data to be synchronized, wherein the data to be synchronized is the item of the first OS;
  encoding the data to be synchronized into a notify packet;
  transmitting the notify packet to the second OS through the notify link; and parsing the notify packet by the second OS, and performing the data-modifying operation according to the notify packet by the second OS.

5. The method as claimed in claim 2, wherein the command link and the notify link follow a transmission control protocol/internet protocol (TCP/IP) standard, and are established on an universal serial bus (USB) interface.

6. The method as claimed in claim 2, wherein the data to be synchronized comprises at least one of a telephone number, an e-mail address, a schedule, an e-mail, and a to-do list.

7. The method as claimed in claim 1, further comprising:
receiving a network data through the network by one of the first OS and the second OS; and
transmitting the network data to the other one of the first OS and the second OS through the virtual network to store or display the network data.

8. The method as claimed in claim 7, wherein the network data comprises a push mail or a push message.

9. The method as claimed in claim 8, further comprising:
transmitting the network data through an universal asynchronous receiver/transmitter (UART) interface or an USB interface through the virtual network if the network data is the push message.

10. A system for simultaneously supporting network sharing and data synchronization, comprising:
a handheld mobile electronic device having a first OS, wherein the first OS is an embedded OS and controls the handheld mobile electronic device which comprises:
a network connecting module, suitable for connecting the first OS to a network;
a network sharing module, coupled to the network connecting module; and
a first data synchronization module, coupled to the network sharing module; and
a computer having a second OS, wherein the second OS is a non-embedded OS and controls the computer which comprises:
a network driving module, suitable for establishing a virtual network with the network sharing module, in order to connect to the first OS, and connect to the network only through the first OS and the virtual network via a physical cable; and
a second data synchronization module, coupled to the network driving module, wherein the first data synchronization module and the second data synchronization module synchronize a plurality of data stored in the first OS and in the second OS through the virtual network wherein the data stored in the first OS and second OS are externally coupled through the virtual network and stored in two separate physical devices.

11. The system as claimed in claim 10, wherein the first data synchronization module and the second data synchronization module establish a command link and a notify link between the first OS and the second OS through the virtual network, obtain an identification and a content relative to a data to be synchronized, wherein the data to be synchronized is an item of one of the first OS and the second OS, and update the relative data of the other one of the first OS and the second OS according to the identification and the content.

12. The system as claimed in claim 11, wherein the second data synchronization module detects a data-modifying operation corresponding to the data to be synchronized, wherein the data to be synchronized is the item of the second OS, encodes the data to be synchronized into a command packet, transmits the command packet to the first OS through the command link, and the command packet is parsed by the first OS so as to perform the data-modifying operation according to the command packet by the first OS.

13. The system as claimed in claim 11, wherein the first data synchronization module detects a data-modifying operation corresponding to the data to be synchronized, wherein the data to be synchronized is the item of the first OS, encodes the data to be synchronized into a notify packet, transmits the notify packet to the second OS through the notify link, and the notify packet is parsed by the second OS so as to perform the data-modifying operation according to the notify packet by the second OS.

14. The system as claimed in claim 11, wherein the data to be synchronized comprises at least one of a telephone number, an e-mail address, a schedule, an e-mail, and a to-do list.

15. The system as claimed in claim 11, wherein the command link and the notify link are established on an USB interface, and follow a TCP/IP standard.

16. The system as claimed in claim 10, wherein the network connecting module receives a network data through the network, the first data synchronization module makes the second data synchronization module to store or display the network data on the second OS through the virtual network.

17. The system as claimed in claim 16, wherein the network data comprises a push mail or a push message.

18. The system as claimed in claim 17, wherein the virtual network transmits the network data through an UART interface or an USB interface if the network data is the push message.

* * * * *